United States Patent
Lewis et al.

(10) Patent No.: US 6,745,165 B2
(45) Date of Patent: *Jun. 1, 2004

(54) METHOD AND APPARATUS FOR RECOGNIZING FROM HERE TO HERE VOICE COMMAND STRUCTURES IN A FINITE GRAMMAR SPEECH RECOGNITION SYSTEM

(75) Inventors: James R. Lewis, Delray Beach, FL (US); Kerry A. Ortega, Raleigh, NC (US); Maria E. Smith, Plantation, FL (US); Thomas A. Kist, Boynton Beach, FL (US); Linda M. Boyer, Boca Raton, FL (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,112

(22) Filed: Jun. 16, 1999

(65) Prior Publication Data

US 2002/0059071 A1 May 16, 2002

(51) Int. Cl.$^7$ ............................................. G10L 15/22
(52) U.S. Cl. ...................................... 704/275; 704/270
(58) Field of Search ............................... 704/251, 275, 704/270, 276

(56) References Cited

U.S. PATENT DOCUMENTS

| | | | | |
|---|---|---|---|---|
| 5,659,665 A | * | 8/1997 | Whelpley, Jr. | ............... 704/275 |
| 5,799,279 A | * | 8/1998 | Gould et al. | ................. 704/275 |
| 5,818,423 A | * | 10/1998 | Pugliese et al. | ............ 345/157 |
| 5,933,807 A | * | 8/1999 | Fukuzawa | .................... 704/275 |
| 5,983,184 A | * | 11/1999 | Noguchi | ..................... 704/270 |
| 6,081,782 A | * | 6/2000 | Rabin | ......................... 704/275 |
| 6,085,159 A | * | 7/2000 | Ortega et al. | ............... 704/235 |
| 6,125,341 A | * | 9/2000 | Raud et al. | ..................... 704/8 |

* cited by examiner

Primary Examiner—Tālivaldis Ivars Šmits
Assistant Examiner—Abul K. Azad
(74) Attorney, Agent, or Firm—Akerman Senterfitt

(57) ABSTRACT

A method and system uses a finite state command grammar coordinated with application scripting to recognize voice command structures for performing an event from an initial location to a new location. The method involves a series of steps, including: recognizing an enabling voice command specifying the event to be performed from the initial location; determining a functional expression for the enabling voice command defined by one or more actions and objects; storing the action and object in a memory location; receiving input specifying the new location; recognizing an activating voice command for performing the event up to the new location; retrieving the stored action and object from the memory location; and performing the event from the initial location to the new location according to the retrieved action and object. Preferably, the enabling-activating command is phrased as "from here . . . to here". The user specifies the new location with voice commands issued subsequent to the enabling command. To reduce the occurrence of unintended events, these voice commands are counted so that if they exceed a predetermined limit, the action and object content is cleared from memory.

30 Claims, 4 Drawing Sheets

Enabling Commands
MOVE THIS SENTENCE FROM HERE
MAKE THE TEXT BLUE FROM HERE
CHANGE THE TEXT TO A TABLE FROM HERE

Activating Command
TO HERE

Functional Expressions
fromhere(sentence, move)
fromhere(selection, blue)
fromhere(selection, texttotable)

Functional Expression
tohere( )

FIG. 5

METHOD AND APPARATUS FOR RECOGNIZING FROM HERE TO HERE VOICE COMMAND STRUCTURES IN A FINITE GRAMMAR SPEECH RECOGNITION SYSTEM

CROSS REFERENCE TO RELATED APPLICATION (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer speech recognition and more particularly to a method and system for accurately recognizing voice command structures to perform various events from an initial location to a new location in a finite grammar speech recognition system.

2. Description of the Related Art

Speech recognition is the process by which an acoustic signal received by microphone is converted into a set of words by a computer. These recognized words may then be used in a variety of computer software applications for purposes such as document preparation, data entry and command and control.

There are two broad categories of speech recognition systems for controlling system and application events: natural language understanding (NLU) systems and finite state grammar systems. NLU systems permit total linguistic flexibility in command expression, recognizing as commands spoken phrases in terms intuitive to the speaker. However, NLU systems are extremely complex, and at this point, operate only on very sophisticated computers.

Consequently, the vast majority of commercial speech recognition systems are finite grammar systems. Finite grammar systems perform events by recognizing spoken words corresponding to a set of prescribed voice commands and executing those commands. The simplest such command and control grammars correlate each function that the system can perform to one speech command. Thus, the speaker must learn and utter a prescribed command, such as "file open", to perform a desired event such as opening a new document in a word processor. More advanced finite state grammar systems allow for increased linguistic flexibility. Such systems may include alternative commands for performing each function, so that a speaker can utter any one of a number of recognized expressions to perform the event. Typically, these systems convert spoken phrases into one of a finite set of functional expressions using translation rules or by parsing annotation in the grammar. These systems, despite having a finite grammar system, enable a speaker to use more natural language expressions to perform desired events.

One problem with advanced natural-language-like finite grammar systems is that the user may believe it is more intelligent than it really is. For instance, by recognizing a term in one context, the user may think the term can be used with the same meaning in other situations. Since these systems have a finite grammar, if a term (or its functional equivalent) is not prescribed to execute an intended event, unexpected events may be performed, or none at all. The likelihood of error increases as the commands get more complex and natural-sounding.

One such natural language expression is a voice command structure for performing various events from one point to another. Examples of such commands include, "move text from here to here" or "make text blue from here to there". Such commands instruct the computer, in a natural way, to perform an action upon an object from one point to another, with the first point being the current position of the object and the second point being a new position indicated by the user. Thus, these commands require the speech recognition system to recognize the desired action to take on an object, but wait until it receives intermediate user input regarding the new position before executing the action.

Current belief is that only sophisticated NLU systems can recognize these complex, multi-part "from here . . . to here" voice command structures. However, the cost and complexity of NLU systems make these systems impractical for use by personal consumers or businesses. And, even NLU systems have difficulty processing these commands when the new position is fixed by voice commands. This is because NLU systems are particularly well-suited for identifying one desired command from a string of spoken words. For example, typical NLU systems would recognize successive voice commands such as "down, down, down" merely as "down", instead of move down three times. Thus, even a costly NLU system may not permit a user to perform an event from one point to another solely by issuing voice commands.

Accordingly, there is a need to provide a finite grammar speech recognition system able to recognize and execute voice command structures to perform events from one point to another.

SUMMARY OF THE INVENTION

The inventors of the present invention have determined that, in a finite grammar speech recognition system, coordinating the grammar with application scripting permits flexible contextual interpretation of a command structure in the grammar. Accordingly, the present invention provides a method and system to recognize and execute finite grammar voice command structures for performing various events from one point to another.

Specifically, the present invention operates on a computer system that is adapted for speech recognition using a finite state grammar, to execute voice commands for performing an event from an initial location to a new location. The method and system is executed by recognizing an enabling voice command which specifies the event to be performed from the initial location. A functional expression, defined by at least an action and an object, is determined corresponding to the enabling voice command, the action and object then being stored in a suitable memory location. An input specifying the new location is received, and an activating voice command for performing the event up to this new location is recognized. The action and object are then retrieved from the memory location, according to which the event is performed from the initial location to the new location. In a preferred embodiment of the invention, the enabling voice command includes the terms "from here" and the activating voice command is "to here".

The present invention thus provides the object and advantage of using a finite grammar speech recognition system to execute "from here . . . to here" voice command structures to perform an event from one point to another. This increases the linguistic flexibility of finite grammar systems. In particular, the present invention permits a user to issue commands using very natural and intuitive terms such as "from here . . . to here" coupled with terms indicating what action to take and the object subject to the action. Additionally, this invention provides the further object and advantage of a finite grammar system capable of executing voice commands in conjunction with intermediate user inputs.

Particularly, the user can specify the new location using a suitable pointing device or by one or more voice commands. The present invention provides the additional object and advantage of performing the desired event from one point to the other solely by voice. In other words, the present invention affords hands-free curser positioning between the enabling and activating commands.

The present invention may also count recognized voice commands issued subsequent to the enabling voice command. If the counted voice commands exceed a prescribed limit, the memory location containing the action and object content is cleared. Also, the action and object content can be cleared from memory after the corresponding event has been performed. This provides the additional object and advantage of reducing the likelihood that unmatched enabling and activating voice commands are inadvertently executed.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 5 shows example enabling and activating commands and their equivalent functional expressions.

DETAILED DESCRIPTION OF THE PREFERRED EMBODIMENT

Figure 1:
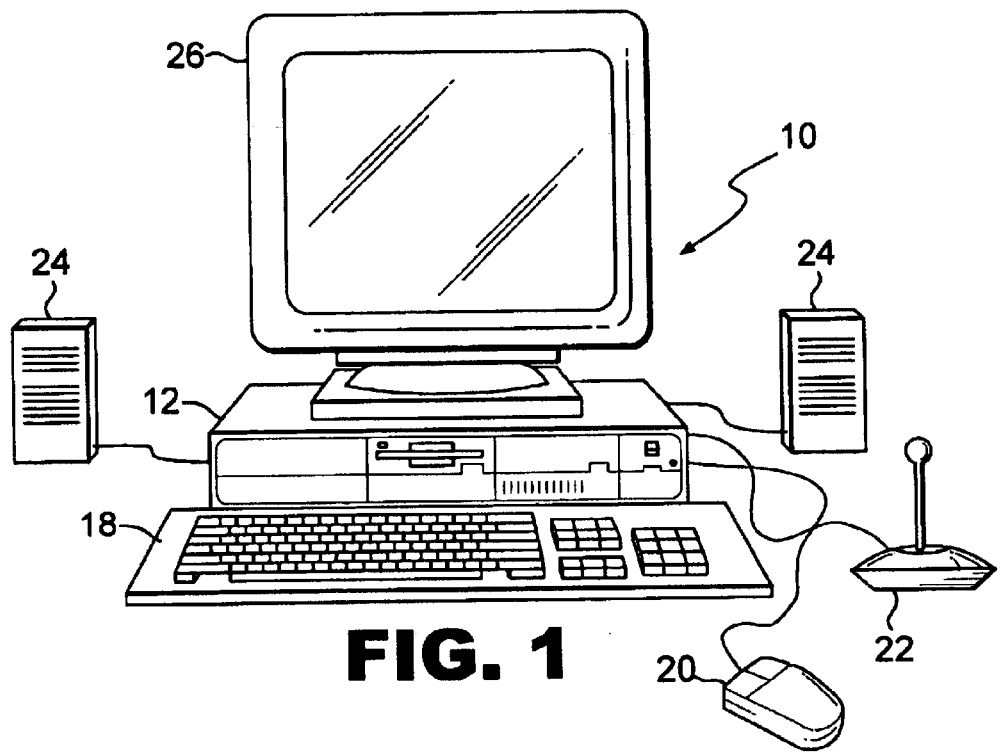
FIG. 1 shows a computer system for speech recognition with which the method and system of the present invention may be used.

Referring to the drawings in detail, wherein like reference characters represent corresponding elements throughout the several views, more specifically referring to FIG. 1, a computer system with which the present invention may be practiced is referred to generally by reference number 10. The computer system 10 is preferably comprised of a computer 12 having a central processing unit 14 (FIG. 2), at least one memory device 16 and related electronic circuitry (not shown). The computer system 10 also includes user input devices, a keyboard 18 and a pointing device 20, a microphone 22, audio loud speakers 24, and a video display 26, all of which are operatively connected to the computer 12 via suitable interface circuitry. The keyboard 18, pointing device 20 and loud speakers 24 may be a part of the computer system 10, but are not required for the operation of the invention.

Generally, the computer system 10, as described above, can be satisfied by any one of many high-speed multi-media personal computers commercially available from manufacturers such as International Business Machines Corporation, Compaq, Hewlett Packard, or Apple Computers. The memory devices 16 preferably include an electronic random access memory module and a bulk storage device, such as a magnetic disk drive. The central processing unit 14 may include any suitable processing chip, such as any of the Pentium family microprocessing chips commercially available from Intel Corporation.

Figure 2:
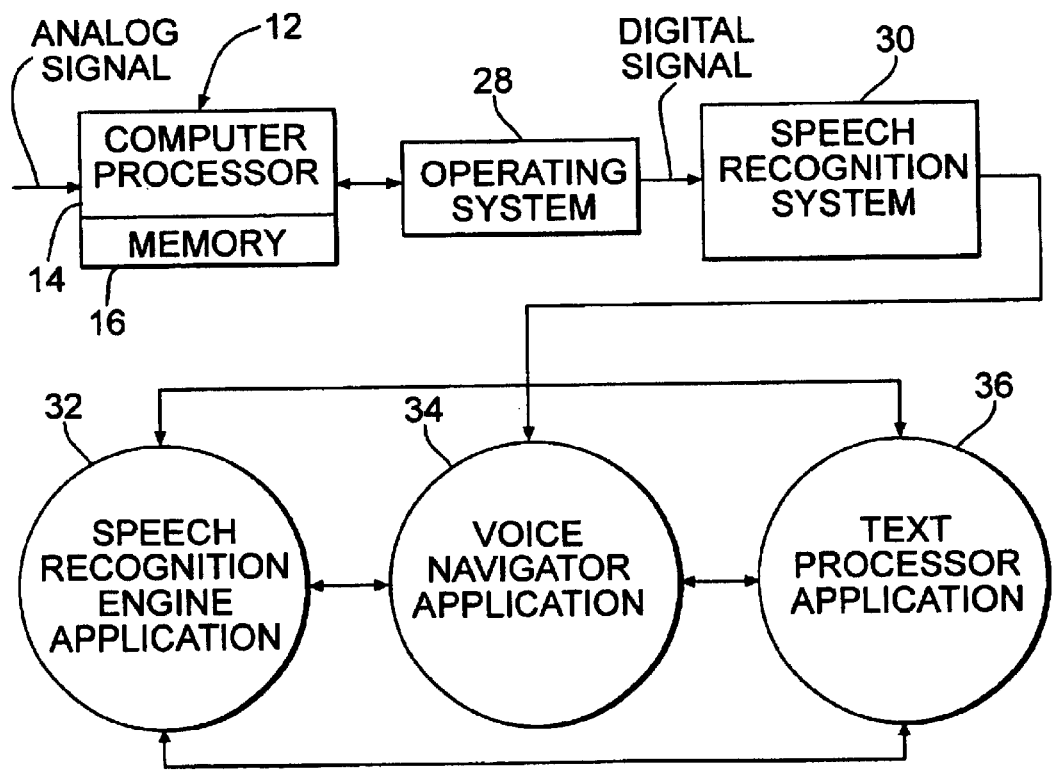
FIG. 2 is a block diagram showing a typical architecture for the computer system of FIG. 1 having a speech recognition engine.

Referring to FIG. 2, which illustrates a typical architecture for a computer system 10 adapted for speech recognition, the system includes an operating system 28 and a speech recognition system 30. The speech recognition system 30 comprises a speech recognition engine application 32 and a voice navigation application 34. A speech text processor application 36 may also be included. However, the invention is not limited in this regard and the speech recognition engine application 32 can be used with any other application program which is to be voice enabled.

In FIG. 2, the speech recognition engine 32, voice navigator 34 and text processor 36 are shown as separate application programs. It should be noted, however, that these applications could be implemented as a single, more complex application. Also, the system 30 may be modified to operate without the text processor application 36, if the speech recognition system 30 is to be used solely for command and control.

In a preferred embodiment, the operating system 28 is one of the Windows family of operating systems, such as Windows NT, Windows '95 or Windows '98, which are available from Microsoft Corporation of Redmond, Wash. The present invention is not limited in this regard, however, as it may also be used with any other type of computer operating system.

Referring still to FIG. 2, in general, an analog audio signal containing speech commands is received by the microphone 22 and processed within the computer 12 by conventional audio circuitry, having an analog to digital convertor, which produces a digitized form of the signal. The operating system 28 transfers the digital command signal to the speech recognition system 30, where the command is recognized by the speech recognition engine 32.

Figure 3:
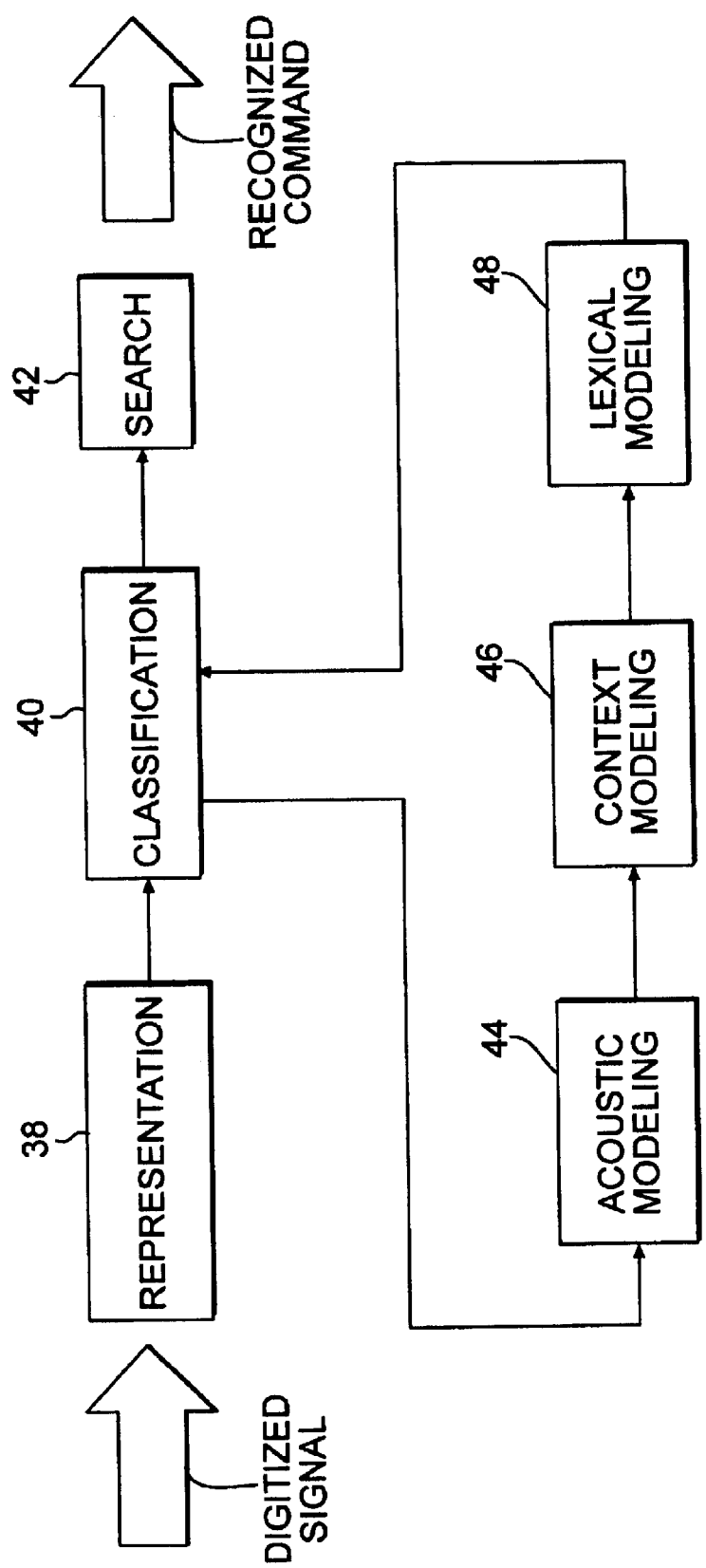
FIG. 3 is a block diagram showing the architecture for a speech recognition engine using multiple constraints in the recognition process.

Referring now to FIG. 3, the speech recognition engine 32 receives the digitized speech signal from the operating system 28. The signal is subsequently transformed in representation block 38 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In classification block 40, the processed speech command signal is used to identify, from the entire set of control commands, a subset of probable commands corresponding to the digitized speech command. This subset of probable commands is searched at block 42 to obtain the recognized command.

Referring still to FIG. 3, classification block 40 is preferably performed by acoustic modeling block 44, context modeling block 46 and lexical/grammatical modeling block 48. At acoustic modeling block 44, known algorithms process the speech command signal to adapt speaker-independent acoustic models, contained in memory 16, to the acoustic signal of the current speaker and identify one or more probable matching commands.

At block 46, additional algorithms process the command signal according to the current state of the computer system as well as context events, including prior commands, system control activities, timed activities, and application activation, occurring prior to or contemporaneously with the spoken command. Specifically, these data structures include activities such as: user inputs by voice, mouse, stylus or keyboard; operation of drop-down menus or buttons; the activation of applications or applets within an application; prior commands; and idle events, i.e., when no activity is logged in an event queue for a prescribed time period. The system states and events can be statistically analyzed, using statistical modeling techniques, to identify one or more probable commands matching the context in which the command was given.

At block 48, known algorithms conform the digitized speech command to lexical and grammatical models. These models are used to help restrict the number of possible words corresponding to a speech signal according a word's use in relation to neighboring words. The lexical model may be simply a vocabulary of words understood by the system. The grammatical model, sometimes referred to as a language model, may be specified simply as a finite state network, where the permissible words following each word are explicitly listed, but is preferably a more sophisticated finite grammar having natural language-like commands making use of context sensitive grammar, as is known in the art.

In its preferred embodiment, the present invention includes all three of the above-described modeling techniques. However, the invention is not limited in this regard and can be performed using more or less modeling techniques. For example, it may be practiced without the event-based context modeling step. Also, each modeling technique may be performed independently from, or interdependently with, the other models.

Figure 4:
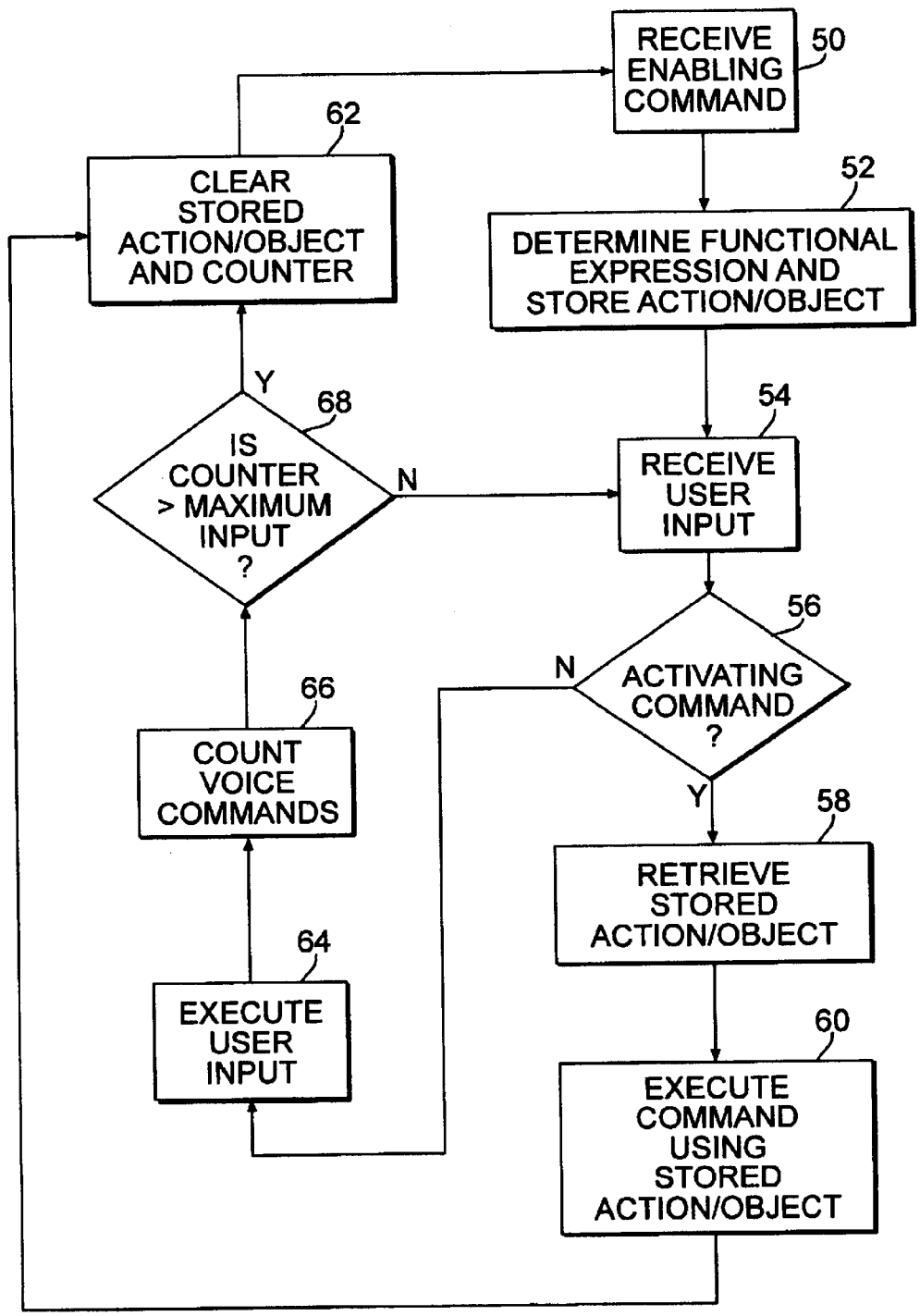
FIG. 4 is a flow chart showing the process for performing an event from an initial location to a new location in a speech recognition system according to a preferred embodiment of the present invention.

Referring now to FIG. 4, the method and system of the present invention begins at step 50 by receiving a user input corresponding to a control command. The system monitors the control commands for a "from here . . . to here" command structure. For example, the user of a speech-enabled word processor application may say, "move this sentence from here . . . to here", "make the text blue from here . . . to here" or "change the text to a table from here . . . to here". Once received, the input speech commands are recognized as described above.

Generally, such "from here . . . to here" command structures include: (1) an enabling phrase (e.g., "move this sentence from here"); (2) one or more intermediate positioning inputs (e.g., "right" "right" "down"); and (3) an activating phrase (e.g., "to here").

The enabling phrase in turn comprises an action segment, object segment and an initialization command, such as "from here". The action segment indicates the desired action to take. In the above examples, the action segments are "move", "make blue" and "text to table", respectively. Any number of other action terms could be identified, such as "open", "get", "copy", "nudge", "start", etc. Similarly, the object segment indicates the application object that is subject to the action. In the first example above, "move this sentence from here . . . to here", the object is "sentence".

Similarly, in both the second and third examples above, the object is "selection", which corresponds to the selected text that is to be made blue or converted into a table, respectively. This segment can be any of a number of objects such as "file", "document", "word", "window", etc. The initialization command is any suitable command indicating the position from which to take the action. Preferably, this command is "from here", since it is a very natural and intuitive expression, allowing the user to feel as though he or she is speaking naturally, rather than issuing a prescribed command. However, the invention is not limited in this regard, as any suitable initialization command may be used.

In the above examples, the action and object are spoken prior to the "from here" phrase. This is the preferred phrasing because it is very natural to say, for example, "move this from here to here". However, the action and object can be stated anywhere prior to the "to here" command and any positioning commands, without going beyond the scope of the present invention.

The second component of the command structure, the intermediate positioning inputs, is used to indicate a new location to which the action is to be performed. Preferably, the new location is indicated by voice commands such as "up", "down", "left", "right", etc. However, the user can utilize other input devices, such as a pointing device, stylus or keyboard, to indicate the new position.

The third component, the activating command, indicates that the action is to be performed at, or up to, the new location. Generally, the activating command triggers the system to perform the desired action from the current position of the object to the new, user-designated location. Preferably, the activating command is "to here", again because it is a natural expression, especially when coupled with an enabling command phrased as "from here". However, the present invention is not limited in this regard, as any term or phrase may be used.

Referring still to FIG. 4, once the speech recognition engine identifies the enabling phrase, at step 52, the system determines a corresponding functional expression. The speech recognition engine coordinates the grammar with a suitable scripting program, as known in the art, so as to convey to a speech-enabled application the action and object specified by the user in the enabling phrase. In other words, the functional expression is scripted in terms of the action, object and initialization command components of the enabling phrase to be used by the speech-enabled application to perform the desired event. Then, the action and object content is stored in a suitable location in the memory 16, to be executed when the user issues the activating "to here" command. This system thus provide flexible contextual interpretation of a single speech command structure ("from here . . . to here") in the grammar.

It will be appreciated by those skilled in the art that the precise mechanism for identifying and scripting the functional expression can vary from system to system. One approach involves the use of translation or rewrite rules such as the set given by way of example in FIG. 5. Using the above examples, as shown in FIG. 5, if the user said "move this sentence from here", a corresponding translation rule is fromhere(sentence, move). Similarly, fromhere(selection, blue) is the functional expression for "make the text blue from here" and fromhere(selection, texttotable) is the functional expression for "change the text to a table from here." FIG. 5 is one example of a set of translation rules and it will be recognized by those skilled in the art that many different translation rules are possible for use with different commands and formats, all such rules being within the scope of the invention.

For systems that do not support translation rules, different methods of producing the functional expression of the natural command phrase would be required. For example, a parsing program can be used for this purpose to parse annotation in the grammar set, as known in the art. It will be appreciated by those skilled in the art that any suitable procedure can be used to accomplish the foregoing result provided that it is capable of taking a given phrase and determining its functional expression or result.

Referring still to FIG. 4, at step 54, additional user input is received for indicating the location of the new position. The user can indicate the new position by using an input device, such as a keyboard, mouse or stylus, or by voice commands. Although not shown, the process can also include a step for verifying that an intermediate positioning input was received (either by voice or other device), and if not, clearing the action and object from memory and returning to step 50 to await another enabling phrase.

At step 56, the system determines whether the last voice command was an activating command. If a pointing device is used to locate the new position, the first voice command is likely the activating command. In this case, at step 58, the stored action and object content is retrieved from memory 16. At step 60, the entire enabling-activating ("from here . . . to here") command is executed to perform the desired event, using the scripted functional expression of the enabling-activating command with the action and object content stored in memory. This can be accomplished by using the retrieved action and object content to select one of a number of function in a code structure, such as a case statement known in the art. Once the command is executed, the stored action and object content is cleared from the memory location, at step 62. This reduces the occurrence of unexpected events by preventing repeated activating commands from being inadvertently executed using the action and object content of a prior enabling command.

If the first voice command after the enabling command is not the activating command, such as if voice commands are used for locating the new position, then the process advances to step 64 where the command is executed and then to step 66 where the command is counted. At step 68, the counter value is compared to a prescribed maximum number of intermediate voice commands, such as ten. If the counter is greater than the maximum value, the process returns to step 62 where the action and object content, as well as the counter value, is cleared from memory. This further reduces the possibility of unexpected events occurring if the system recognizes an activating command out of context of the enabling command.

Otherwise, if the counter is less than the prescribed maximum value, which should be the case on the first pass, the process returns to step 54 where additional user input is received. If the input is an activating command, the stored action and object are retrieved and the entire command is executed, as described above. Otherwise, as described, the counter is incremented and compared to the prescribed maximum value. Once the memory location is cleared, either after an activating command is received or the counter is at the maximum value, the speech recognition system continues to receive and recognize other commands, until another enabling command is issued, in which case the entire process begins anew at step 50.

Step 62 of the above-described embodiment prevents repeated activating commands from using the same stored action and object content without a new matching enabling command. This embodiment could be altered somewhat, however, without departing from the scope of the present invention. Specifically, the system could permit repeated activating commands that are associated with a "paste" function, as is known in the art, making this determination at an additional query step (not shown). As an example, the user could say "copy this sentence from here . . . to here" "to here" "to here". In this example, only the first activating command ("to here") has a corresponding enabling command ("from here"); the other two are unmatched. Normally, this should be prevented since it may lead to the occurrence of unexpected events, as mentioned above. However, when the enabling command is equivalent to a "paste function", the benefits gained in time and convenience by repeating only the activating command may outweigh the risk of performing an unexpected "paste" event.

Additionally, the above description includes examples of the present invention used to manipulate text in word processing applications. However, the present invention is not limited in this regard, as it may be employed in any speech-enabled application to perform a variety of events. For example, the present invention may be used to reposition or resize an active window in a database or other applications. Also, the above description assumes the initial location from which the event is performed is the current position of the object. However, as with the ending point, the initial position may be set to any location by the user via a pointing device or voice commands.

Moreover, the enabling-activating command given in the above description of the present invention is stated in terms of "from here . . . to here". This phrasing is used because it is believed to be a natural and intuitive expression for performing an event from one point to another. However, any suitable terms may be used having the same command structure, such as "from here . . . to there" or "from the current position . . . to the new position", etc. Also, the same technique can be used to perform an event from one point to another temporally, using a system timer and a corresponding command, such as "from now . . . to then".

While the foregoing specification illustrates and describes the preferred embodiments of the invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

We claim:

1. In a computer system adapted for speech recognition using a finite state grammar, a method for executing voice commands to perform an event from an initial location to a new location, comprising the steps of:

providing a single voice command comprising an enabling voice command and an activating voice command;

recognizing the enabling voice command specifying an object and an action to be performed on said object from said initial location;

storing said action and object of said enabling voice command in memory for subsequent use;

receiving at least one intermediate input relocating a pointer to indicate said new location;

recognizing the activating voice command that specifies said new location, but no action or object, wherein said activating voice command activates stored portions of said previously received enabling voice command;

responsive to recognizing said activating voice command, identifying said new location;

retrieving said previously stored action and object of said enabling voice command from said memory; and performing said event from said initial location to said new location, such that said event is determined from, at least in part, said previously stored action and object of said enabling voice command.

2. The method of claim 1, further comprising:

determining a functional expression from said enabling voice command, said functional expression being defined by said action and object.

3. The method of claim 2, further comprising the step of clearing said action and object from said memory after performing said event.

4. The method of claim 2, further comprising the steps of:

counting recognized voice commands issued following said enabling voice command; and clearing said action and object from said memory if said counted voice commands exceed a predetermined limit.

5. The method of claim 1, further comprising the step of, after said step of storing said action and object of said enabling voice command and before said step of recognizing an activating voice command, receiving at least one additional user input which is unrelated to said event to be performed from said initial location to said new location.

6. The method of claim 1, wherein said initial location is determined by identifying a first location of a pointer, said at least one intermediate input relocates said pointer to said new location, and said new location is determined by identifying a second location of said pointer.

7. The method of claim 1, wherein said at least one intermediate input is one or more voice commands.

8. The method of claim 1, wherein said at least one intermediate input is received from a pointing device.

9. The method of claim 1, further comprising the step of receiving user input indicating the position of said initial location.

10. The method of claim 1, wherein said enabling voice command includes "from here" and said activating voice command is "to here".

11. A computer speech recognition system using a finite state grammar and executing voice commands to perform an event from an initial location to a new location, comprising:

means for providing a single voice command comprising an enabling voice command and an activating voice command;

means for recognizing the enabling voice command specifying an object and an action to be performed on said object from said initial location;

means for storing said action and object of said enabling voice command in memory for subsequent use;

means for receiving at least one intermediate input relocating a pointer to indicate said new location;

means for recognizing the activating voice command that specifies said new location, but no action or object, wherein said activating voice command activates stored portions of said previously received enabling voice command;

means for identifying said new location responsive to recognizing said activating voice command;

means for retrieving said previously stored action and object of said enabling voice command from said memory; and means for performing said event from said initial location to said new location, such that said event is determined from, at least in part, said previously stored action and object of said enabling voice command.

12. The system of claim 11, further comprising:

means for determining a functional expression from said enabling voice command, said functional expression being defined by said action and object.

13. The system of claim 12, further comprising means for clearing said action and object from said memory after performing said event.

14. The system of claim 12, further comprising:

means for counting recognized voice commands issued following said enabling voice command; and means for clearing said action and object from said memory if said counted voice commands exceed a predetermined limit.

15. The system of claim 11, further comprising:

means for receiving at least one additional user input which is unrelated to said event to be performed from said initial location to said new location, said means for receiving at least one additional user input being operative after said means for storing said action and object of said enabling voice command and before said means for recognizing an activating voice command.

16. The system of claim 11, wherein said initial location is determined by identifying a first location of a pointer, said at least one intermediate input relocates said pointer to said new location, and said new location is determined by identifying a second location of said pointer.

17. The system of claim 11, wherein said at least one intermediate input is one or more voice commands.

18. The system of claim 11, wherein said at least one intermediate input is received from a pointing device.

19. The system of claim 11, further comprising means for receiving user input indicating the position of said initial location.

20. The method of claim 11, wherein said enabling voice command includes "from here" and said activating voice command is "to here".

21. A machine readable storage, having stored thereon a computer program having a plurality of code sections executable by a machine for causing the machine to perform the steps of:

providing a single voice command comprising an enabling voice command and an activating voice command;

recognizing the enabling voice command specifying an object and an action to be performed on said object from an initial location;

storing said action and object of said enabling voice command in memory for subsequent use;

receiving at least one intermediate input relocating a pointer to indicate said new location;

recognizing the activating voice command that specifies said new location, but no action or object, wherein said activating voice command activates stored portions of said previously received enabling voice command;

responsive to recognizing said activating voice command, identifying said new location;

retrieving said previously stored action and abject of said enabling voice command from said memory; and performing said event from said initial location to said new location, such that said event is determined from, at least in part, said previously stored action and object of said enabling voice command.

22. The machine readable storage of claim 21, further comprising the step of:

determining a functional expression from said enabling voice command, said functional expression being defined by said action and object.

23. The machine readable storage of claim 22, further comprising the step of clearing said action and object from said memory after performing said event.

24. The machine readable storage of claim 22, further comprising the steps of:

counting recognized voice commands issued following said enabling voice command; and clearing said action and object from said memory if said counted voice commands exceed a predetermined limit.

25. The machine readable storage of claim 21, further comprising the step of, after said step of storing said action and object of said enabling voice command and before said step of recognizing an activating voice command, receiving at least one additional user input which is unrelated to said event to be performed from said initial location to said new location.

26. The machine readable storage of claim 21, wherein said initial location is determined by identifying a first location of a pointer, said at least one intermediate input relocates said pointer to said new location, and said new location is determined by identifying a second location of said pointer.

27. The machine readable storage of claim 21, wherein said at least one intermediate input is one or more voice commands.

28. The machine readable storage of claim 21, wherein said at least one intermediate input is received from a pointing device.

29. The machine readable storage of claim 21, further comprising the step of receiving user input indicating the position of said initial location.

30. The machine readable storage of claim 21, wherein said enabling voice command includes "from here" and said activating voice command is "to here".

* * * * *